(12) United States Patent
Tennis et al.

(10) Patent No.: US 8,153,195 B2
(45) Date of Patent: Apr. 10, 2012

(54) DOT SIZE CONTROLLING PRIMER COATING FOR RADIATION CURABLE INK JET INKS

(75) Inventors: Matt Tennis, Grand Blanc, MI (US); Joshua Samuel, Ann Arbor, MI (US); Paul A. Edwards, Ypsilanti, MI (US)

(73) Assignee: Electronics For Imaging, Inc., Foster City, CA (US)

( * ) Notice: Subject to any disclaimer, the term of this patent is extended or adjusted under 35 U.S.C. 154(b) by 644 days.

(21) Appl. No.: 11/851,832

(22) Filed: Sep. 7, 2007

(65) Prior Publication Data

US 2008/0063799 A1 Mar. 13, 2008

Related U.S. Application Data

(60) Provisional application No. 60/843,479, filed on Sep. 9, 2006.

(51) Int. Cl.
*B41J 2/01* (2006.01)
*B05D 1/36* (2006.01)
*C08F 2/50* (2006.01)
*C08F 120/18* (2006.01)

(52) U.S. Cl. ............ 427/261; 522/64; 526/329.7; 347/1

(58) Field of Classification Search .................. 427/261; 522/64; 526/329.7
See application file for complete search history.

(56) References Cited

U.S. PATENT DOCUMENTS

| | | | |
|---|---|---|---|
| 5,958,169 A | 9/1999 | Titterington et al. | |
| 6,071,334 A | 6/2000 | Wider et al. | |
| 6,550,906 B2 | 4/2003 | Ylitalo | |
| 6,589,636 B2 | 7/2003 | Emslander et al. | |
| 6,616,741 B1 | 9/2003 | Sawa et al. | |
| 6,638,995 B1 | 10/2003 | Gelarden | |
| 6,660,354 B2 * | 12/2003 | Suwa et al. | 428/41.8 |
| 6,691,610 B1 | 2/2004 | Wilen | |
| 6,720,042 B2 * | 4/2004 | Ylitalo et al. | 428/32.26 |
| 6,793,859 B2 | 9/2004 | Emslander et al. | |
| 6,800,341 B2 | 10/2004 | Emslander et al. | |
| 6,846,075 B2 | 1/2005 | Ylitalo et al. | |
| 6,857,737 B2 | 2/2005 | Emslander et al. | |
| 6,881,458 B2 | 4/2005 | Ludwig et al. | |
| 6,896,944 B2 | 5/2005 | Ylitalo et al. | |
| 7,025,453 B2 | 4/2006 | Ylitalo et al. | |
| 2002/0182376 A1 | 12/2002 | Mukherjee et al. | |
| 2003/0079649 A1 | 5/2003 | Kelly-Rowley et al. | |
| 2003/0107635 A1 | 6/2003 | Kinning et al. | |
| 2004/0126708 A1 | 7/2004 | Jing et al. | |
| 2004/0201660 A1 * | 10/2004 | Nishikawa et al. | 347/100 |
| 2004/0213928 A1 | 10/2004 | Sebastian et al. | |
| 2004/0241451 A1 | 12/2004 | Clark et al. | |
| 2004/0258856 A1 | 12/2004 | Ylitalo et al. | |
| 2005/0008861 A1 | 1/2005 | Yadav et al. | |
| 2005/0078158 A1 | 4/2005 | Magdassi et al. | |
| 2005/0103182 A1 | 5/2005 | Spurgeon | |
| 2005/0190245 A1 * | 9/2005 | Desie et al. | 347/100 |
| 2005/0282928 A1 | 12/2005 | Lin et al. | |
| 2006/0111466 A1 | 5/2006 | Bujard et al. | |
| 2006/0132566 A1 | 6/2006 | Desie et al. | |
| 2007/0076069 A1 | 4/2007 | Edwards et al. | |

FOREIGN PATENT DOCUMENTS

| | | |
|---|---|---|
| JP | 2002169486 | 6/2002 |
| WO | WO 01/68596 | 9/2001 |
| WO | WO 02/085638 | 10/2002 |
| WO | WO 03/018645 | 3/2003 |
| WO | WO 2004/035684 | 4/2004 |

* cited by examiner

*Primary Examiner* — Timothy Meeks
*Assistant Examiner* — Mandy Louie
(74) *Attorney, Agent, or Firm* — Michael A. Glenn; Glenn Patent Group

(57) ABSTRACT

The present invention provides a printing method for printing radiation-curable ink jet ink printing comprising a clear coat primer composition comprising: a low surface tension monofunctional alkyl acrylate monomer with a surface tension in the range of 23 to 31 dynes/cm in which the alkyl group has at least 8 carbon atoms; a photoinitiator; and other UV curable monomers and oligomers. The clear coat primer composition is applied first onto a substrate and cured with actinic radiation or cationic curable ink jet ink is printed on the surface of the clear coat primer coating.

9 Claims, No Drawings

DOT SIZE CONTROLLING PRIMER COATING FOR RADIATION CURABLE INK JET INKS

FIELD

The present disclosure describes radiation curable primer coatings that can be used to adjust, or control, the drop size of a radiation curable ink jet ink deposited on the cured primer coatings.

BACKGROUND

The statements in this section merely provide background information related to the present disclosure and may not constitute prior art.

While theoretically one would want a drop size that is the $\sqrt{2}$/DPI which in the case of a 300 Dots Per Inch (DPI) printer would be 119 microns there are many cases in which it would be advantageous to have a larger drop size. In real printing systems movement of the print head impacts the precision in which drops can be laid down. These factors will normally be greater at the point that two heads are stitched together. The imprecision will be further exacerbated if there is a requirement to deposit the ink from a gap between print head and substrate exceeding 1 mm. In commercial applications there are many cases in which the theoretically best drop size will not yield the best print quality because it is necessary to adapt the drop spread to compensate for the misplacements. Thus it would be highly advantageous to have a way to enable the user to control and adjust the drop spread to be able to use a greater number of print head and print ink combinations.

SUMMARY

The present invention provides a printing method for printing radiation-curable ink jet ink, comprising first applying on to a substrate a primer composition comprising: a low surface tension monofunctional alkyl acrylate monomer with a surface tension in the range of 23 to 31 dynes/cm in which the alkyl group has at least 8 carbon atoms; a photoinitiator; and other UV curable monomers and oligomers. The primer composition is then cured with actinic radiation. Then, a UV curable or cationic curable ink jet ink is printed on the surface of the cured primer coating.

The present invention also provides a method of adjusting an ink jet ink printed dot size, comprising applying on at least a portion of a substrate a primer composition comprising (i) monofunctional alkyl (meth)acrylate in which the alkyl group has at least 8 carbon atoms, having a surface tension less than 30 dynes/cm (ii) a photoinitiator; (iii) an acrylate material comprising monomers selected from the group consisting essentially of alkoxylated diacrylates, alkoxylated triacrylates, amino acrylates, monofunctional and multifunctional monomers, oligomers and mixtures thereof; curing the applied primer composition to form a primer coating; and printing a radiation curable ink jet ink on the surface of the primer coating, wherein the amount of monofunctional acrylate (i) is selected to produce a desired dot size of applied radiation curable ink jet ink.

Further areas of applicability will become apparent from the description provided herein.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this technology and, unless explicitly stated otherwise, are not intended to be a representation that given embodiments of this technology have, or have not, been made or tested.

As used herein, the words "preferred" and "preferably" refer to embodiments that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology.

"A" and "an" as used herein indicate "at least one" of the item is present; a plurality of such items may be present, unless the context clearly dictates otherwise. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

A radiation curable primer coating as now disclosed is applied and cured before printing an ink jet ink to adjust and control drop size of a radiation curable ink jet ink deposited on the cured primer coating. The primer composition can be applied by any conventional printing method including, but not limited to, flexographic flood coat. The primer composition may also be deposited on only a part of the surface of the substrate, in one or a plurality of areas, by a suitable printing method, such as ink jet printing, so that the primer coating conforms closely to the printed image that is deposited on the coating. Typically, the curing radiation is UV light or electron beam radiation, preferably UV light.

The primer composition comprises a mixture of monomers or oligomers or both, a portion of which may be monofunctional and at least a portion of which is multifunctional, a suitable photoinitiator or combination of photoinitiators, and at least one monomer with a low surface tension in the range of 23 to 31 dynes/cm. The monomer with the low surface tension is included in an amount selected to produce a desired dot size of UV curable ink jet ink that is applied over the cured primer composition. The monomer with low surface tension can be added up to a level that does not inhibit cure. The monomer with low surface tension is included in an amount so that the cured primer coating adjusts and controls the drop size of printed ink jet ink, resulting in print that has a finer print quality. The low surface tension monomer may be added up to a final amount of about 30% by weight in the primer composition, based on the total of radiation curable components in the primer composition, although in some embodiments it may be beneficial to include up to about 25%, or up to about 20% of the low surface tension monomer, based on the total of radiation curable components in the primer composition. Increasing the level of the low surface tension monomer can reduce the drop spread of an overlaid ink jet ink. In some embodiments, the primer composition contains at least about 1%, or at least about 5% or at least about 10% of the low surface tension monomer, based on the total of radiation curable components in the primer composition.

In addition to the monomer with low surface tension, the primer composition contains monomers and oligomers suited to giving a viscosity suitable for the application method by which it will be coated on the substrate. In various embodiments, the primer composition is an acrylate-based radiation curing composition. In addition to the low surface tension monomer, the primer composition may also contain diacrylates such as 1,6-hexanediol diacrylate; tripropylene glycol diacrylate; alkoxylated acrylates such as propoxylated-2-neopentyl glycol diacrylate or alkoxylated hexanediol diacrylate. The primer composition may contain acrylates of higher functionality that increases cure speed. In certain embodiments, the amount of higher functionality acrylates that can be included may be limited by the desired application viscosity for the application method selected. Examples of higher functionality monomers are trimethylol propane triacrylate, ethoxylated trimethylolpropane triacrylate, pentaerythritol tetraacrylate. In some embodiments, polyfunctional oligomers such as epoxy acrylates, urethane acrylates and polyester acrylates may be included.

In one embodiment, small amounts of highly functionalized hyperbranched polyester polyacrylates such as CN2302 from Sartomer with a functionality of 15 and a viscosity of 350 cps (at 25° C.) are included in the primer composition. In some embodiments, the primer composition is applied using an ink jet printhead, in which case viscosity may be maintained at between 4 to 16 cps at the ink jet printing temperature which may be up to 70° C. This viscosity requirement for ink jet printing may limit the amount of oligomers such as epoxy acrylates, urethane acrylates and polyester acrylates that may be included in the primer composition.

In other embodiments, the primer composition comprises low surface tension monomers to reduce the drop size of the overlaid ink jet ink, such as low surface tension acrylate monomers selected from isodecyl acrylate, isooctyl acrylate, 3,3,5-trimethylcyclohexyl acrylate, and mixtures thereof. In various embodiments, the concentration of these low surface tension monomers can range from about 1 to about 30%, or from about 5% to about 25%, or from about 10% to about 20%, or from about 12% to about 19%, or may be in a range within any of these ranges (which may include one endpoint of such range). Generally, as in the embodiment described above, these low surface tension acrylate monomers have a surface tension less than 30 dynes/cm. A low surface tension monomer such as isodecyl acrylate with a surface tension of 28.6 dynes/cm, isooctyl acrylate with a surface tension of 28.6 dynes/cm and a viscosity in the range from about 5 to about 7 cps or 3,3,5-trimethylcyclohexyl acrylate (CD420 Sartomer) with a surface tension of 23.7 dynes/cm, can be added to adjust or control the drop spread of the ink jet ink to a desired dot size.

Surface energy can be measured using a dynamic contact angle method looking at the advancing wetting angle of a single drop. A two liquid method using water and diiodomethane can be used to quantify surface energy. Methods used to calculate surface energy are provided by the Owens, Wendt, Rabel, Kaelble method which is extensively used and is commonplace among those skilled in the art. Such methods incorporate two additive components, dispersive and polar.

The viscosity of the primer composition may be higher if the clear coat primer composition is applied by some other method available for example by means of flexographic printing, gravure coating or using coaters such as curtain coaters or slot coaters. The composition can also contain additional radiation curable monomers that effectively copolymerize with the acrylates such as vinyl caprolactam. The clear coat primer composition provides the ink jet ink print good print characteristics, cure and adhesion.

The primer composition may further include a photoinitiator when it is to be cured by UV radiation. Examples of suitable photoinitiators include, without limitation, benzoin ethers such as benzoin methyl ether, benzoin ethyl ether, benzoin phenyl ether, and so on; alkylbenzoins such as methylbenzoin, ethylbenzoin, and so on; benzyl derivatives including benzyldimethylketal; 2,4,5-triarylimidazole dimers including 2-(o-chlorophenyl) -4,5-diphenylimidazole dimer, 2-(o-chlorophenyl)-4,5-di (m-methoxyphenyl)imidazole dimer, 2-(o-fluorophenyl)-4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, and so on; acridine derivatives such as 9-phenylacridine and 1,7-bis(9, 9'-acridinyl)heptane; N-phenylglycine; aromatic ketones such as trimethylbenzophenone, isopropylthioxanthone, benzophenone, 2-chloro and 2-ethyl-thioxanthone, 2,2-dimethoxy-2-phenylacetophenone, 2,2-diethoxyacetophenone, 2-hydroxy-2-methyl-1-phenyl-propanone, oligo-[2-hydroxy-2-methyl-1-[4-(1-methylvinyl)phenyl]propanone, 1-hydroxycyclohexyl-acetophenone, and 2-ethyl-hydroquinone; phosphine oxides, such as 2,4,6-trimethylbenzoyl-diphenylphosphine oxide, and combinations of these. The photoinitiator typically comprises from about 5% to about 15% of the total mixture by weight. Non-limiting examples of photoinitiators include alpha-hydroxy ketones such as 2-hydroxy-2-methyl-1-phenylpropanone. Other classes of photoinitiators can include alpha aminoketones, acyl phosphines, benzophenone derivatives, thioxanthones and amine co-initiators. If cured by electron beam radiation, no photoinitiator package would be required for an acrylate based ink.

Commercial photoinitiators are available, for example, from Ciba (based in Switzerland) and Lamberti (based in Italy).

A cationically cured primer composition can contain vinyl ethers such as glycol divinylether or aliphatic epoxies, such as the cycloaliphatic epoxide UVR-6105 and is commercially available from Dow Chemical, Midland, Mich. In various embodiments, the primer composition can further comprise amines as co-initiators or amino acrylates that may act both as comonomers and co-initiators, depending on the photoinitiator package used. The amines and aminoacrylates may be incorporated to increase surface cure and negate the detrimental effect of oxygen. In some embodiments, stabilizers which are essentially radical scavengers, can be added to stabilize the clear coat primer composition and inhibit premature curing, for example UV 10 from Ciba.

The primer composition may contain additives that are typically used in actinic radiation curable inks and coatings. The primer composition can be unpigmented to form clear coat primer coatings. The primer compositions may alternatively contain at least one colorant, such as a pigment. Examples of pigments that may be used include, without limitation, inorganic pigments and fillers such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, ferric ammonium ferrocyanide (Prussian blue), ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and so on.

The primer composition can be used to form coatings on various types of substrates, particularly those used for label printing. These can include polyolefin films, polyester films such as poly(ethylene terephthalate) (PET), and vinyl films, both treated and untreated. The coating may also be used on paper label stock. Examples of label stock include gloss, semi gloss, calendared, and matt stock. The gloss stock may be coated, for example clay coated stock.

The primer composition is applied on a substrate before the ink jet ink. After the primer composition has been cured to form a primer coating, ink jet ink is printed on top of the primer coating.

Typical ink jet ink formulations include monomers of acrylate and low viscosity vinyl materials. The polyfunctional monomers can include polyacrylates. The ink further can include a reactive oligomer. Examples of suitable reactive oligomers include, without limitation, oligomers having at least one, preferably more than one, ethylenically unsaturated double bonds, such as acrylated epoxy oligomers, acrylated polyurethane oligomers, acrylated polyesters, and combinations of these. Preferred oligomers have average functionality of from about 1.6 to about 2.0. It is also preferred to use oligomers having molecular weight between about 300 and about 500. The ink may contain up to about 6.0% by weight of the reactive oligomer, preferably from about 2.0% to about 5.0% by weight of the reactive oligomer, more preferably from about 2.5% to about 4.0% by weight of the reactive oligomer. Clear coat primer compositions containing various levels of low surface tension monomers are deposited on a substrate and cured. Ink jet ink is printed then cured under standard conditions on the surface of the clear coat primer coating on the substrate.

The ink may further include polyfunctional monomers, such as alkylenediol diacrylates such as 1,6-hexanediol diacrylate and neopentylglycol diacrylate, cyclohexanedimethanol diacrylate, polyalkylene glycol di(meth)acrylates such as triethylene glycol diacrylate, ether modified monomers such as propoxylated neopentylglycol diacrylate, and higher functionality monomers such as trimethylolpropane triacrylate, trimethylolethane triacrylate, and pentaerythritol tetracrylate, and so on, as well as combinations of such polyfunctional monomers.

The pigment or pigments in the ink jet ink may be any of those suitable for ink jet inks. In general, pigments for ink jet inks have a maximum particle size that is small enough to avoid clogging the ink jets during printing. The pigments preferably have a narrow particle size distribution. Among those that may be mentioned are C.I. Pigment Yellow 93, 95, 109, 110, 120, 128, 138, 139, 151, 154, 155, 173, 180, 185 and 193; C.I. Pigment Orange 34, 36, 43, 61, 63 and 71; C.I. Pigment Red 122, 202, 254, and a solid solution of C.I. Pigment Red 122 and 202; C.I. Pigment Blue 15:3 and 15:4; C.I. Pigment Violet 19, 23 and 33; C.I. Pigment Black 7. The ink jet inks are preferably used in a set that provides for full-color printing of images. In one preferred embodiment, an ink set including cyan, magenta, yellow, and black (CMYK) inks is used. For example, yellow, C.I. Pigment Yellow 138, 151, 154, 180 and 185 may be used in the yellow ink; C.I. Pigment Red 122 and 202, 254, and C.I. Pigment Violet 19 may be used in the magenta ink; C.I. Pigment Blue 15 may be used in the cyan ink; and an acidic or neutral pigment of C.I. Pigment Black 7 may be used in the black ink.

The amount of pigment included in the ink will depend on, for example, which pigment is used. In general, the ink jet ink contains from about 0.5 to about 15% by weight of pigment. While a sufficient amount of pigment is included to attain the desired color density of the ink, including more pigment also tends to increase viscosity. Suitable pigments are available, for example and without limitation, from Clariant Corporation of Coventry, R.I. and Ciba Specialty Chemicals Corp. of Basel, Switzerland. In some embodiments, other ink jet ink additives can be added, including, but not limited to up to approximately 10% solvent.

The ink jet ink is printed over the cured clear coat primer coating. The ink jet ink may be printed using drop-on-demand (DOD) ink jet printer. The ink jet ink can printed in particular using piezo driven DOD heads (modules) where the ink is ejected in accordance with a digitally driven image by flexing of a piezoelectric crystal in the printhead. The printing module will typically have a large number of nozzles, and the printer will be made up of an aligned group of modules. An example of a piezo driven printing module is the SL-128 printhead from Spectra that jets a nominal 80 picoliter drop.

In a preferred embodiment, the ink jet ink can be printed over the primer coating using grey scale piezo printhead such as the Leopard™ from Toshiba Tech Japan. The printheads are capable of generating 8 discrete grey levels. When printing at 300 DPI with a CMYK printer in single pass the eight grey levels are capable of generating quality that rivals photographic quality. Attaining this high quality requires precise control of the drop size.

In various embodiments, the ink jet ink and primer composition can be cured using actinic radiation, including UV radiation and electron beam radiation. In some embodiments, curing can be accomplished using cationic curing systems commonly known in the art.

The invention is further illustrated by the following examples.

Examples

Clear coat primer compositions containing various levels of a low surface tension monomer (monomers that have a surface energy less than 30 dynes/cm) are deposited on a substrate and cured. Ink jet ink is jetted under standard conditions, cured and the dot size measured. To make the clear coat primer composition samples, a base composition is prepared comprising:

50% ethoxylated (3) trimethylopropane triacrylate (SR454, available from Sartomer)
40% 1,6-hexanediol diacrylate (SR238 available from Sartomer)
10% 2-hydroxy-2-methyl-1-phenylpropanone (Darocur 1173 available from Ciba).

A comparative Example A, base composition is made and applied onto a PET substrate. Examples 1-3 of the composition invention with varying levels of isodecyl acrylate as shown in the table below are made by replacing the 1,6-hexanediol diacrylate up to 30% in the base composition.

The sample clear coat primer compositions are deposited on PET samples with a 6 Meyer rod giving a coating thickness of approximately 10 microns. Samples are cured using a Fusion Lighthammer 6 using an H bulb at 100 feet/minute. The samples are then printed with a grayscale head (Leopard from Toshiba Tech) using cyan inks produced by Jetrion (Jetrion EFI, Ypsilanti, Mich.). The UV curable grayscale inks are printed on the surface of the clear coat primer coatings and base composition coating at 60 feet/minute time and exposed to lamp in a period of 0.5 seconds. The size of the UV curable grayscale ink dots can be measured using an optical microscope and SCION image software. It should be noted that the surface energy is overwhelmingly dispersive, from 95-98%.

TABLE 1

Effect of varying the concentration of monoacrylate isodecyl acrylate on the final ink jet ink composition surface energy

|  | % isodecyl acrylate | Drop Diameter (Microns) | Surface Energy (Dynes cm$^{-1}$) |
| --- | --- | --- | --- |
| Comparative Example A | 0 | 190 | 44 ± 1 |
| Ex. 1 | 16 | 170 | 35 ± 0.7 |
| Ex. 2 | 23 | 155 | 29 ± 1 |
| Ex. 3 | 30 | 137 | 28 ± 5 |

The data demonstrates that increasing percentage concentrations of isodecyl acrylate in the clear coat primer composition result in smaller ink jet ink drops being deposited on the clear coat primer coated substrate. Furthermore, as the percentage of isodecyl acrylate used in the composition is increased, a resultant decrease in ink jet ink surface energy can be observed.

What is claimed is:

1. A method for printing an image on a surface of a substrate, the method comprising the steps of:
    applying a primer composition onto at least a portion of the surface of the substrate to conform to the image to be printed, wherein the primer composition comprises
        a first part comprising a monofunctional alkyl acrylate monomer having a surface tension in the range of 23 to 31 dynes/cm, in which the alkyl group has at least 8 carbon atoms;
        a second part comprising a photoinitiator; and
        a curable third part comprising any of an oligomer, an acrylate monomer, or a mixture thereof, wherein at least a portion of the third part of the primer composition is multifunctional, and wherein the acrylate monomer is selected from the group consisting of alkoxylated diacrylates, alkoxylated triacrylates, amino acrylates, monofunctional acrylate monomers, and multifunctional acrylate monomers;
    curing the applied primer composition; and
    printing a UV curable ink jet ink on top of the surface of the cured primer composition;
    wherein the first part of the primer composition is included in an amount that is selectably adjusted to produce a desired dot size of the printed UV curable ink jet ink.

2. The method of claim 1, wherein the alkyl group of the alkyl acrylate is branched.

3. The method of claim 1, wherein the alkyl acrylate is selected from the group consisting of isodecyl acrylate, isooctyl acrylate, 3,3,5-trimethylcyclohexyl acrylate and mixtures thereof.

4. The method of claim 1, wherein the primer composition is unpigmented.

5. A method for printing an image on a surface of a substrate, the method comprising the steps of:
    (a) applying a primer composition onto at least a portion of the surface of the substrate to conform to the image to be printed, wherein the primer composition comprises
        a first part comprising a monofunctional alkyl acrylate having a surface tension of less than 30 dynes/cm, in which the alkyl group has at least 8 carbon atoms,
        a second part comprising a photoinitiator, and
        a third curable part comprising any of an oligomer, an acrylate monomer, or a mixture thereof, wherein at least a portion of the third part of the primer composition is multifunctional, and wherein the acrylate monomer is selected from the group consisting of alkoxylated diacrylates, alkoxylated triacrylates, amino acrylates, monofunctional acrylate monomers, and multifunctional acrylate monomers;
    (b) curing the applied primer composition; and
    (c) printing a radiation curable ink jet ink on top of the surface of the cured primer composition;
    wherein the first part of the primer composition is included in an amount that is selectably adjusted to produce a desired dot size of the printed radiation curable ink jet ink.

6. The method of claim 5, wherein the monofunctional alkyl acrylate comprises isodecyl acrylate, isooctyl acrylate, 3,3,5-trimethylcyclohexyl acrylate and mixtures thereof.

7. The method of claim 5, wherein the radiation curable ink jet is a Grayscale ink, the method further comprising the step of:
    adjusting the level of the first part of the primer composition to adjust the drop diameter of Grayscale ink.

8. The method of claim 5, wherein the primer composition is unpigmented.

9. A method for printing an image on a surface of a substrate, the method comprising the steps of:
    applying a clear primer composition onto at least a portion of the surface of the substrate to conform to the image to be printed, wherein the primer composition comprises
        a first part comprising a monofunctional alkyl acrylate monomer having a surface tension in the range of 23 to 31 dynes/cm, in which the alkyl group has at least 8 carbon atoms;
        a second part comprising a photoinitiator; and
        a curable third part comprising any of an oligomer, an acrylate monomer, or a mixture thereof, wherein at least a portion of the third part of the primer composition is multifunctional, and wherein the acrylate monomer is selected from the group consisting of alkoxylated diacrylates, alkoxylated triacrylates, amino acrylates, monofunctional acrylate monomers, and multifunctional acrylate monomers;
    curing the applied clear primer composition with actinic radiation; and
    printing a UV curable ink jet ink at 300 DPI with a grey scale printhead on top of the surface of the cured clear primer composition, wherein the grey scale printhead has eight grey levels;
    wherein the first part of the primer composition is included in an amount that is selectably adjusted to produce a desired dot size of the printed UV curable ink jet ink with the grey scale printhead without inhibiting the curing step, while comprising up to 30 percent by weight of the clear primer composition based on the total of radiation curable components in the clear primer composition.

* * * * *